(12) United States Patent
Yin

(10) Patent No.: US 8,750,143 B2
(45) Date of Patent: Jun. 10, 2014

(54) EXTENDED UPLINK CONTROL INFORMATION (UCI) REPORTING VIA THE PHYSICAL UPLINK CONTROL CHANNEL (PUCCH)

(75) Inventor: Zhanping Yin, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 750 days.

(21) Appl. No.: 12/753,561

(22) Filed: Apr. 2, 2010

(65) Prior Publication Data

US 2011/0242997 A1    Oct. 6, 2011

(51) Int. Cl.
*H04L 1/00* (2006.01)
*H04W 72/02* (2009.01)
*H04L 1/16* (2006.01)

(52) U.S. Cl.
CPC .......... *H04L 1/0031* (2013.01); *H04W 72/02* (2013.01); *H04L 1/1671* (2013.01)
USPC ........................................ 370/252

(58) Field of Classification Search
CPC .... H04L 1/0031; H04L 1/1671; H04W 72/02
USPC .................. 370/252, 329, 330, 470, 203–211
See application file for complete search history.

(56) References Cited

U.S. PATENT DOCUMENTS

| | | | |
|---|---|---|---|
| 2008/0232449 A1* | 9/2008 | Khan et al. ................... | 375/220 |
| 2009/0109917 A1 | 4/2009 | Pajukoski et al. | |
| 2009/0141690 A1 | 6/2009 | Fan et al. | |
| 2009/0196229 A1 | 8/2009 | Shen et al. | |
| 2009/0201869 A1 | 8/2009 | Xu et al. | |
| 2009/0227278 A1* | 9/2009 | Cho et al. ....................... | 455/522 |
| 2009/0232065 A1 | 9/2009 | Zhang et al. | |
| 2009/0232067 A1 | 9/2009 | Pajukoski et al. | |
| 2009/0323613 A1 | 12/2009 | Frederiksen et al. | |
| 2009/0323617 A1 | 12/2009 | Che et al. | |
| 2010/0041344 A1 | 2/2010 | Kim et al. | |
| 2010/0067472 A1 | 3/2010 | Ball et al. | |
| 2011/0216677 A1* | 9/2011 | Ahmadi et al. ............... | 370/295 |
| 2011/0228863 A1* | 9/2011 | Papasakellariou et al. ... | 375/259 |
| 2012/0127950 A1* | 5/2012 | Chung et al. .................. | 370/329 |
| 2013/0148592 A1* | 6/2013 | Noh et al. ...................... | 370/329 |

FOREIGN PATENT DOCUMENTS

| | | |
|---|---|---|
| EP | 1 973 284 | 9/2008 |
| EP | 2 101 437 | 9/2009 |
| WO | 2009/156441 | 12/2009 |

OTHER PUBLICATIONS

Ericsson, ST-Ericsson, "On PUCCH Resource Allocation for Carrier Aggregation," 3GPP TSG-RAN WG1 #60, R1-100845, Feb. 2010.
Catt, "Combination of UCI Transmission in Rel-10," 3GPP TSG RAN WG1 Meeting #62bis, R1-105157, Oct. 2010.
International Search Report issued for International Patent Application No. PCT/JP2011/058750 on Jul. 12, 2011.
Ericsson, ST-Ericsson, "A/N Transmission in the Uplink for Carrier Aggregation," R1-100909, Feb. 2010.

(Continued)

*Primary Examiner* — Luat Phung
(74) *Attorney, Agent, or Firm* — Austin Rapp & Hardman

(57) ABSTRACT

A method for reporting uplink control information (UCI) is described. A first part of the UCI is encoded in a single physical uplink control channel (PUCCH) symbol. A channel of the PUCCH symbol is selected to implicitly encode a second part of the UCI in the PUCCH symbol. The PUCCH symbol is transmitted via a single PUCCH signal.

33 Claims, 9 Drawing Sheets

(56) References Cited

OTHER PUBLICATIONS

NTT DoCoMo, "Uplink ACK/NACK Transmission Scheme on PUUCH for LTE-Advanced," R1-101209, Feb. 2010.
Qualcomm Incorporated, "CQI Feedback for Multicarrier Operation," R1-101478, Feb. 2010.
CATT, "CQI Feedback for LTE-A," R1-100878, Feb. 2010.
Nokia Siemens Networks, Nokia, "Performance Comparison of PUUCH ACK/NACK Transmission Schemes for CC Aggregation," R1-101418, Feb. 2010.
Texas Instruments, "Views on ACK/NACK Resource Allocation," R1-101085, Feb. 2010.
Motorola, "Uplink ACK/NACK for Carrier Aggregation," R1-101468, Feb. 2010.
Samsung, "UL HARQ-ACK Signal Transmission in Rel-10," R1-101146, Feb. 2010.
CATT, "UL ACK/NACK Transmission Design in FDD with CA," R1-100876, Feb. 2010.
NTT DoCoMo, "Clarification of UCI Transmission Scheme with Simultaneous Data Transmission," R1-101210, Feb. 2010.
3GPP TS 36.212 V9.0.0, "Evolved Universal Terrestrial Radio Access (E-UTRA); Multiplexing and Channel Coding (Release 9)," Dec. 2009.
3GPP TS 36.211 V9.0.0, "Evolved Universal Terrestrial Radio Access (E-UTRA); Physical Channels and Modulation (Release 9)," Dec. 2009.
3GPP TS 36.300 V9.0.0, "Evolved Universal Terrestrial Radio Access (E-UTRA) and Evolved Universal Terrestrial Radio Access Network (E-UTRAN); Overall Description; Stage 2 (Release 9)," Jun. 2009.
3GPP TS 36.213 V8.6.0, "Evolved Universal Terrestrial Radio Access (E-UTRA) Physical layer procedures," Mar. 2009.
MCC Support, "Draft Report of 3GPP TSG RAN1 WG1 #60 v0.1.0," R1-10xxxx, Feb. 2010.

* cited by examiner

EXTENDED UPLINK CONTROL INFORMATION (UCI) REPORTING VIA THE PHYSICAL UPLINK CONTROL CHANNEL (PUCCH)

TECHNICAL FIELD

The present invention relates generally to wireless communications and wireless communications-related technology. More specifically, the present invention relates to extended uplink control information (UCI) reporting via the physical uplink control channel (PUCCH).

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of cells, each of which may be serviced by a base station. A base station may be a fixed station that communicates with mobile stations.

Various signal processing techniques may be used in wireless communication systems to improve efficiency and quality of wireless communication. One such technique may include using multiple antennas for multiple-input and multiple-output (MIMO) or transmit diversity (TxD). Additional gains may be realized within these channels. Benefits may be realized by providing gains within these control channels while maintaining or increasing reliability and sustaining compatibility with older equipment. Therefore, benefits may be realized by improved coding techniques.

DETAILED DESCRIPTION

Figure 1:
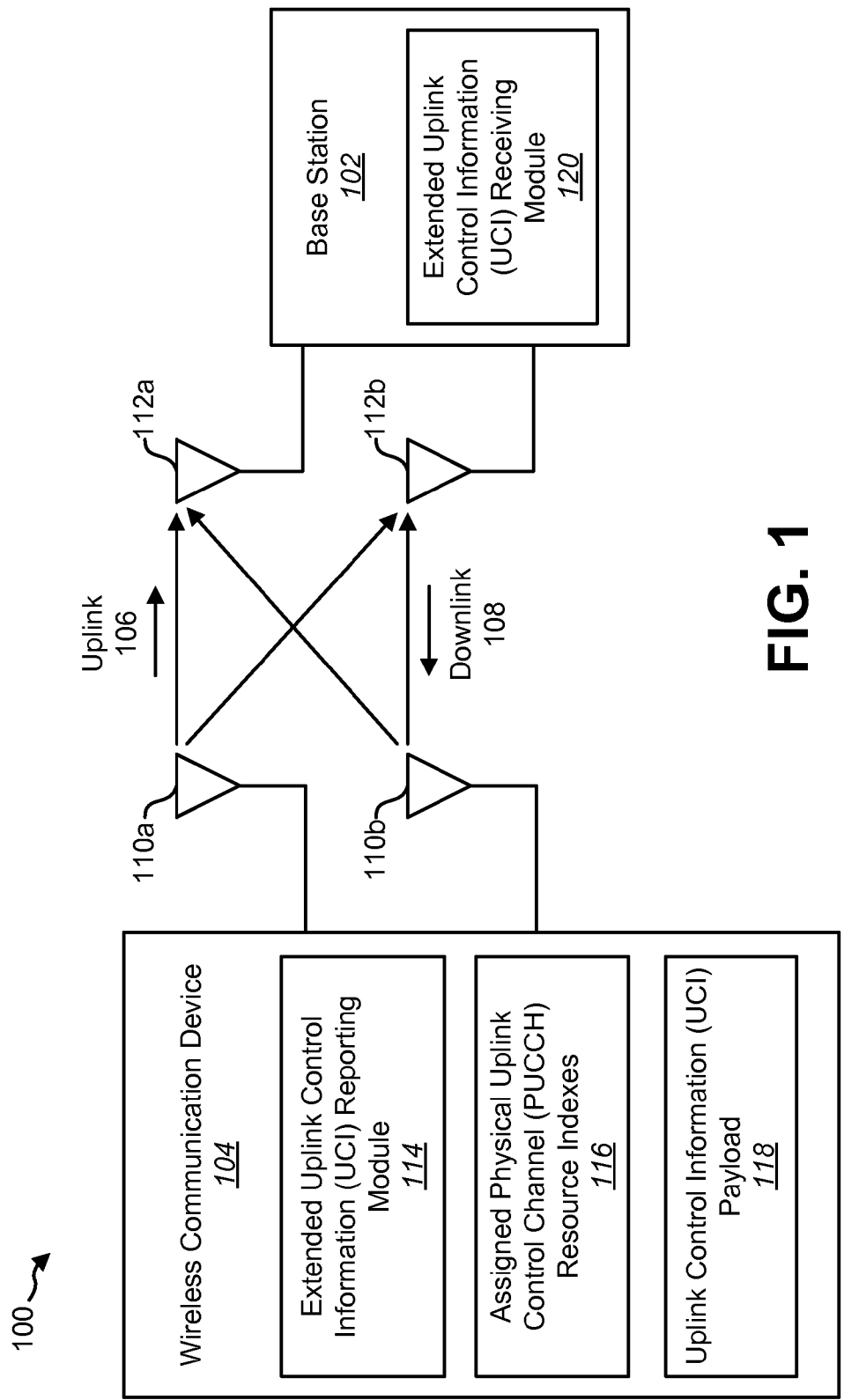
FIG. 1 is a block diagram illustrating a wireless communication system with a wireless communication device and a base station.

A method for reporting uplink control information (UCI) is described. A first part of the UCI is encoded in a single physical uplink control channel (PUCCH) symbol. A channel of the PUCCH symbol is selected to implicitly encode a second part of the UCI in the PUCCH symbol. The PUCCH symbol is transmitted via a single PUCCH signal.

A reference signal (RS) may be transmitted using a PUCCH resource with a predefined or configured resource index. The predefined or configured resource index may indicate the selected channel for the PUCCH symbol. Downlink channels may be measured. The UCI may be generated based on the measured downlink channels. The UCI may include a channel quality indicator (CQI), a precoding matrix index (PMI), rank indication (RI) and acknowledgement/negative acknowledgement (ACK/NACK) information.

The PUCCH symbol may be configured for uplink signaling. A number of coded UCI bits for implicit transmission may be determined using channel selection. Selecting a channel of the PUCCH symbol may include generating a first bit or the first bit and a second bit of the coded UCI bits using a table. The first bit or the first bit and the second bit may be transmitted in the PUCCH symbol.

The table may be a sample mapping table. The first bit or the first bit and the second bit may be transmitted by selecting the corresponding PUCCH resource index. The PUCCH symbols may be generated from another or the same set of the first bit or the first bit and the second bit with binary phase shift keying (BPSK) or quadrature phase shift keying (QPSK) modulation.

A UCI payload size may be determined. It may also be determined whether the UCI payload size is an extended UCI payload size. The PUCCH symbol may be generated using a symbol level extended channel selection mechanism if the UCI payload size is an extended UCI payload size. It may be determined whether an extended channel selection format is used for a Release-8 payload if the UCI payload size is not an extended UCI payload size. The PUCCH symbol may be generated using Release-8 PUCCH formats if the UCI payload size is not an extended UCI payload size and the extended channel selection is not used for a Release-8 payload. The PUCCH symbol may be generated using a symbol level extended channel selection mechanism if the extended channel selection is used for a Release-8 payload.

The method may be performed by a wireless communication device configured to operate in a Long Term Evolution-Advanced (LTE-A) wireless communication system. Each PUCCH symbol in a slot may use the same time-frequency resource block (RB), different orthogonal sequences, and different cyclic shifts. The channel of the PUCCH symbol may be selected from one or more assigned PUCCH resource indexes. Selecting a channel of the PUCCH symbol may implicitly encode two bits of the UCI in the PUCCH symbol. Selecting a channel of the PUCCH symbol may achieve a transmit diversity (TxD) effect.

The first part of the UCI may include acknowledgement/negative acknowledgement (ACK/NACK) bits and the second part of the UCI may include channel quality indicator (CQI) bits. The first part of the UCI and the second part of the UCI may include joint coding of channel quality indicator (CQI) bits and acknowledgement/negative acknowledgement (ACK/NACK) bits.

An apparatus configured for reporting uplink control information (UCI) is described. The apparatus includes a processor, memory in electronic communication with the processor and instructions stored in the memory. The instructions are executable to encode a first part of the UCI in a single physical uplink control channel (PUCCH) symbol. The instructions are also executable to select a channel of the PUCCH symbol to implicitly encode a second part of the UCI in the PUCCH symbol. The instructions are further executable to transmit the PUCCH symbol via a single PUCCH signal.

A method for receiving extended uplink control information (UCI) is disclosed. A physical uplink control channel (PUCCH) symbol is received. A channel selection of the received PUCCH symbol is detected. Reference signal (RS) symbols are used to perform channel estimation on the PUCCH.

PUCCH resource indexes may be configured for a wireless communication device. A PUCCH RS symbol may be received on a PUCCH resource with a predefined or configured resource index. The predefined or configured resource index may indicate the selected channel of the PUCCH symbol. The UCI may include a channel quality indicator (CQI), a precoding matrix index (PMI), rank indication (RI) and acknowledgement/negative acknowledgement (ACK/NACK) information. Each PUCCH symbol in a slot may use the same time-frequency resource block (RB), different orthogonal sequences, and different cyclic shifts.

The channel selection of the PUCCH symbol may be selected from one or more PUCCH resource indexes assigned to a transmitting wireless communication device. The channel selection of the received PUCCH symbol implicitly may encode two bits of the UCI in the PUCCH symbol.

An apparatus configured for receiving extended uplink control information (UCI) is described. The apparatus includes a processor, memory in electronic communication with the processor and instructions stored in the memory. The instructions are executable to receive a physical uplink control channel (PUCCH) symbol. The instructions are also executable to detect a channel selection of the received PUCCH symbol. The instructions are further executable to use reference signal (RS) symbols to perform channel estimation on the PUCCH.

FIG. 1 is a block diagram illustrating a wireless communication system 100 with a wireless communication device 104 and a base station 102. A base station 102 may be in wireless communication with one or more wireless communication devices 104. A base station 102 may be referred to as an access point, a Node B, an eNodeB, or some other terminology. Likewise, a wireless communication device 104 may be referred to as a mobile station, a subscriber station, an access terminal, a remote station, a user terminal, a terminal, a handset, a subscriber unit, user equipment, or some other terminology. A wireless communication device 104 may be a cellular phone, a smart phone, a laptop, a personal digital assistant (PDA), a wireless modem, etc. The wireless communication device 104 may transmit data to the base station 102 over a radio frequency (RF) communication channel. Likewise, the base station 102 may transmit data to the wireless communication device 104 over a radio frequency (RF) communication channel.

A wireless communication device 104 may communicate with zero, one or multiple base stations 102 on the downlink 108 and/or uplink 106 at any given moment. The downlink 108 refers to the communication link from a base station 102 to a wireless communication device 104. The uplink 106 refers to the communication link from a wireless communication device 104 to a base station 102.

Communication between a wireless communication device 104 and a base station 102 may be accomplished using transmissions over a wireless link including an uplink 106 and a downlink 108. The communication link may be established using a single-input and single-output (SISO), multiple-input and single-output (MISO) or a multiple-input and multiple-output (MIMO) system. A MIMO system may include both a transmitter and a receiver equipped with multiple transmit and receive antennas. A MIMO system may provide improved performance if the additional dimensionalities created by the multiple transmit and receive antennas are utilized.

The use of multiple antennas 110a-b on the wireless communication device 104 may allow transmit diversity on the uplink 106. In transmit diversity, signals originating from the two or more independent sources that have been modulated with identical information-bearing signals may be used. Transmit diversity may help overcome the effects of fading, outages and circuit failures.

In $3^{rd}$ Generation Partnership Project (3GPP) Long Term Evolution (LTE)-Advanced, additional control feedback will have to be sent on control channels to accommodate MIMO and carrier aggregation (CA). Carrier aggregation refers to transmitting data on multiple component carriers (CC) which are contiguously or separately located. Both the acknowledge/negative-acknowledge (ACK/NACK) bits and other control information may be transmitted using the physical uplink control channel (PUCCH).

The wireless communication device 104 may transmit uplink control information (UCI) to the base station 102 on the uplink 106. Besides ACK/NACK bits, the uplink control information (UCI) may include a channel quality indicator (CQI), a precoding matrix index (PMI), rank indication (RI) and a scheduling request (SR). The wireless communication device 104 may also transmit a reference signal (RS) and ACK/NACK bits to the base station 106. The ACK/NACK bits and the uplink control information (UCI) may be transmitted using the physical uplink control channel (PUCCH). One or more physical uplink control channel (PUCCH) reference signal (RS) symbols are included in a physical uplink control channel (PUCCH) signal transmission on each slot. Depending on the size of the uplink control information (UCI) payload 118, new methods of transmitting the uplink control information (UCI) to the base station 102 may be necessary.

In LTE Release-8, only one uplink 106 component carrier (CC) and one downlink 108 component carrier (CC) can be used for each wireless communication device 104. The uplink control information (UCI) such as ACK/NACK bits for hybrid ARQ (HARQ) and periodic channel quality indicators (Cal), precoding matrix index (PMI) and rank indication (RI) can be sent on the physical uplink control channel (PUCCH). The physical uplink control channel (PUCCH) may occupy one resource block (RB) at each slot. Thus, a very limited amount of information can be transmitted on the physical uplink control channel (PUCCH). With physical uplink control channel (PUCCH) format 1/1a/1b, only one or two ACK/NACK bits are transmitted. With physical uplink control channel (PUCCH) format 2/2a/2b, one or two ACK/NACK bits can be simultaneously transmitted with four to eleven bits of CQI/PMI/RI. Thus, the maximum payload size that can be carried on a Release-8 physical uplink control channel (PUCCH) is thirteen bits.

In LTE-Advanced (LTE-A) (i.e., Release-10 and beyond) carrier aggregation (CA) is supported to increase the data throughput. With carrier aggregation (CA), a maximum of five component carriers (CC), each with a maximum of 20 megahertz (MHz) may be allocated for a wireless communication device 104. Thus, a maximum of 100 MHz bandwidth may be allocated for a wireless communication device 104.

In LTE-A, the number of downlink 108 carriers may be asymmetric from the number of uplink 106 carriers. Thus, the number of uplink 106 component carriers (CC) may not be the same as the number of downlink 108 component carriers (CC). Directly mapping of an uplink 106 component carrier (CC) and downlink 108 component carrier (CC) is not possible. In the 3GPP RAN1 #60, it was agreed that the uplink control information (UCI), including the ACK/NACK, CQI, PMI and RI, be sent on a single uplink 106 component carrier (CC) specific to each wireless communication device 104.

Due to the mismatch between the number of downlink 108 component carriers (CC) used (up to five) and the number of uplink 106 component carriers (CC) used (one), more uplink control information (UCI) bits need to be reported on a Release-10 physical uplink control channel (PUCCH). If a Release-8 uplink control information (UCI) payload 118 for each component carrier (CC) is transmitted, up to five times the size of a Release-8 payload is required in a worst case scenario for the five downlink 108 component carriers (CC). For ACK/NACK only, the number of feedback bits could go up to twelve in order to report all possible states. For channel quality indicators (COI), a cyclic report of each component carrier (CC) or a report of the combined channel quality indicators (COI) with extended payload size can be used. Reporting mechanisms should be defined based on the payload information.

With extended payload size, the current Release-8 physical uplink control channel (PUCCH) formats for uplink control information and ACK/NACK transmission will not be sufficient. For ACK/NACK multiplexing, many companies are considering reusing Release-8 format 2. If format 2 is reused for ACK/NACK multiplexing, there may be no space to carry the channel quality indicators (COI) together with the multiplexed ACK/NACK. One solution is to increase the number of physical uplink control channel (PUCCH) transmissions. In multiple physical uplink control channel (PUCCH) signal transmissions, a wireless communication device 104 transmits multiple physical uplink control channel (PUCCH) signals over multiple physical uplink control channel (PUCCH) resources. Thus, the total transmission power and the frequency-time resource usage are multiplied.

However, increasing the number of physical uplink control channel (PUCCH) transmissions increases the cubic metric (CM), thereby affecting the battery life of the wireless communication device 104. Multiple physical uplink control channel (PUCCH) transmissions may also cause more interference, since the physical uplink control channel (PUCCH) transmissions and the physical uplink shared channel (PUSCH) transmissions are simultaneous. Multiple physical uplink control channel (PUCCH) transmissions may also decrease the power efficiency of a wireless communication device 104. Therefore, it is important to find a way to extend the number of physical uplink control channel (PUCCH) payload bits without transmitting multiple physical uplink control channel (PUCCH) signals.

An extended uplink control information (UCI) reporting module 114 on the wireless communication device 104 may increase the number of physical uplink control channel (PUCCH) payload bits without transmitting multiple physical uplink control channel (PUCCH) signals. The extended uplink control information (UCI) reporting module 114 may use a channel selection concept to increase the number of physical uplink control channel (PUCCH) payload bits.

In the Release-8 time division duplexing (TDD) system, ACK/NACK multiplexing with channel selection is used to support up to four bits of the ACK/NACK and discontinuous transmission (DTX) information. The wireless communication device 104 may be assigned four physical uplink control channel (PUCCH) resource indexes 116. Format 1/1a/1b is used to carry two bits of information and the selection of which channel to use can carry two extra bits of information. In Release-8, the selected physical uplink control channel (PUCCH) is used for the entire subframe. Since format 1/1a/1b has less overhead than format 2/2a/2b, a similar ACK/NACK reporting mechanism may be used in Release-10 for ACK/NACK bits when the number of ACK/NACK bits is less than or equal to four (a maximum of 2 bits with format 1b and 2 bits by channel selection). Format 1/1a/1b has less overhead than format 2/2a/2b because multiple physical uplink control channel (PUCCH) format 1/1a/1b signals can be multiplexed on one physical uplink control channel (PUCCH) format 2/2a/2b resource. It may be beneficial to reuse channel selection with format 1/1a/1b to support 4 bits.

In the extended uplink control information (UCI) reporting module 114, the channel selection concept may be extended from the subframe level to a symbol level. Each symbol may then carry two additional bits. The channel selection mechanism forms an implicit channel for extra information. In quadrature phase shift keying (QPSK) modulation on the physical uplink control channel (PUCCH), the use of the implicit channel by channel selection could double the number of coded bits transmitted over the physical uplink control channel (PUCCH).

Each wireless communication device 104 may be assigned four physical uplink control channel (PUCCH) resource indexes 116. The assigned physical uplink control channel (PUCCH) resource indexes 116 may be the channel selections available to the wireless communication device 104. The assigned physical uplink control channel (PUCCH) resource indexes 116 may be assigned to wireless communication devices 104 by a scheduler in such a fashion that the collision probability between multiple wireless communication devices 104 is minimized. The scheduler may be a function on the base station 102.

The extended uplink control information (UCI) reporting module 114 may double the number of coded bits available on a physical uplink control channel (PUCCH) transmission. Thus, the extended uplink control information (UCI) reporting module 114 may provide opportunities for more ACK/NACK and uplink control information (UCI) reporting formats and extended uplink control information (UCI) payload 118 sizes. For Release-8 frequency division duplexing (FDD) payloads and formats, the extended uplink control information (UCI) reporting module 114 may provide transmit diversity (TxD) by transmitting on the implicit channel obtained by channel selection without occupying and transmitting on an extra physical uplink control channel (PUCCH) resource. Transmitting only one physical uplink control channel (PUCCH) signal at any given symbol may maintain the cubic metric (CM) property without introducing additional physical uplink control channel (PUCCH) transmission overhead. The extended uplink control information (UCI) reporting module 114 may also allow for a flexible allocation between uplink control information (UCI) bits and ACK/NACK bits.

The base station 102 may receive physical uplink control channel (PUCCH) transmissions from the wireless communication device 104 using one or more antennas 112*a-b*. The base station 102 may include an extended uplink control information (UCI) receiving module 120. Because the additional bits are implicitly encoded within the physical uplink control channel (PUCCH) symbol in an extended uplink control information (UCI) report, the base station 102 may use the extended uplink control information (UCI) receiving module 120 to decode the implicit bits.

In the Release-8 time division duplexing (TDD) channel selection, the selected physical uplink control channel (PUCCH) resource is used throughout the subframe. Therefore, the base station 102 performs a blind decoding to decide which resource index is used. A resource index represents the physical uplink control channel (PUCCH) resources to be used, which defines the time-frequency resource block (RB), an orthogonal sequence (with length $N_{seq}^{SUCCH}=12$) and a cyclic shift value on the sequence.

The extended uplink control information (UCI) receiving module 120 may use the physical uplink control channel (PUCCH) reference signal (RS) symbols to perform channel estimation on the received physical uplink control channel (PUCCH) symbols. The physical uplink control channel (PUCCH) reference signal (RS) symbols may be transmitted from the wireless communication device 104 to the base station 102 with physical uplink control channel (PUCCH) signal transmission. In order to use physical uplink control channel (PUCCH) reference signal (RS) symbols to perform channel estimation after the detection of channel selection, physical uplink control channel (PUCCH) symbols transmitted in one slot should be on the same time-frequency resource block (RB). The physical uplink control channel (PUCCH) resource assignment may allocate physical uplink control channel (PUCCH) resources on the same time-frequency resource block (RB) and apply different orthogonal sequences and/or cyclic shifts. The scheduler may assign the best sequence and cyclic shift combinations to minimize the blind decoding miss-detection probability.

The extended uplink control information (UCI) receiving module 120 may already know the physical uplink control channel (PUCCH) resource index used for physical uplink control channel (PUCCH) symbols. The base station 102 may receive on a physical uplink control channel (PUCCH) resource with a predefined or configured resource index for physical uplink control channel (PUCCH) reference signal (RS) symbols from the wireless communication device 104. For example, the base station 102 may know that a physical uplink control channel (PUCCH) index number 0 is used by the wireless communication device 104 to transmit physical uplink control channel (PUCCH) reference signal (RS) symbols. Or, the physical uplink control channel (PUCCH) index number for physical uplink control channel (PUCCH) reference signal (RS) symbols may be controlled by upper layer signaling. If the extended uplink control information (UCI) receiving module 120 is aware of the physical uplink control channel (PUCCH) resource index used, no blind detection is necessary for reference signals (RS). This may reduce the miss-detection probability due to the wrong reference signal (RS) estimation.

Figure 2:
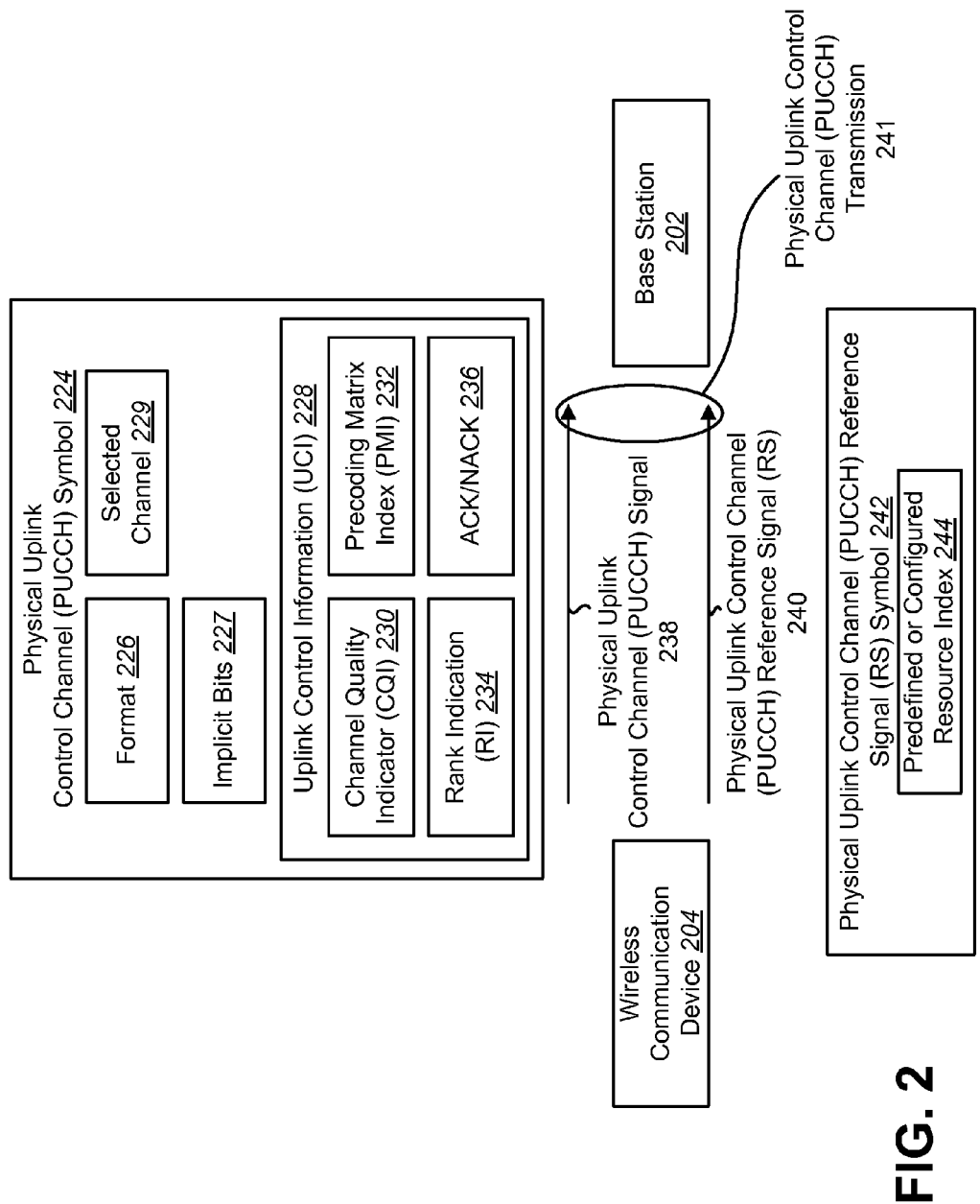
FIG. 2 is a block diagram illustrating transmissions from a wireless communication device to a base station.

FIG. 2 is a block diagram illustrating transmissions from a wireless communication device 204 to a base station 202. The wireless communication device 204 of FIG. 2 may be one configuration of the wireless communication device 104 of FIG. 1. Likewise, the base station 202 of FIG. 2 may be one configuration of the base station 102 of FIG. 1. The wireless communication device 204 may transmit a physical uplink control channel (PUCCH) symbol 224 via a physical uplink control channel (PUCCH) signal 238 to the base station 202.

The physical uplink control channel (PUCCH) symbol 224 may include uplink control information (UCI) 228. The uplink channel information (UCI) 228 may include a channel quality indicator (COI) 230, a precoding matrix index (PMI) 232, a rank indication (RI) 234 and/or ACK/NACK 236 information. The physical uplink control channel (PUCCH) symbol 224 may further include a format 226 for which the physical uplink control channel (PUCCH) symbol 224 was transmitted. For example, the physical uplink control channel (PUCCH) symbol 224 may be transmitted using format 1/1a/1b, format 2/2a/2b or any other new formats. The physical uplink control channel (PUCCH) symbol 224 may include implicit bits 227 in a selected channel 229. The implicit bits 227 may refer to the extra bits encoded within the physical uplink control channel (PUCCH) symbol 224 by using the selected channel 229.

Thus, for each physical uplink control channel (PUCCH) symbol 224, a physical uplink control channel (PUCCH) signal 238 is transmitted with a modulated symbol in the format 226 on the selected channel 229, where the implicit bits 227 are indicated by choosing the corresponding physical uplink control channel (PUCCH) resource index.

The wireless communication device 204 may also transmit a reference signal (RS) symbol 242 to the base station 202 via a physical uplink control channel (PUCCH) reference signal (RS) 240. The reference signal (RS) symbol 242 may be transmitted on the physical uplink control channel (PUCCH) resource indicated by a predefined or configured resource index 244. The combination of a physical uplink control channel (PUCCH) signal 238 and a physical uplink control channel (PUCCH) reference signal (RS) 240 forms a physical uplink control channel (PUCCH) transmission 241.

Figure 3:
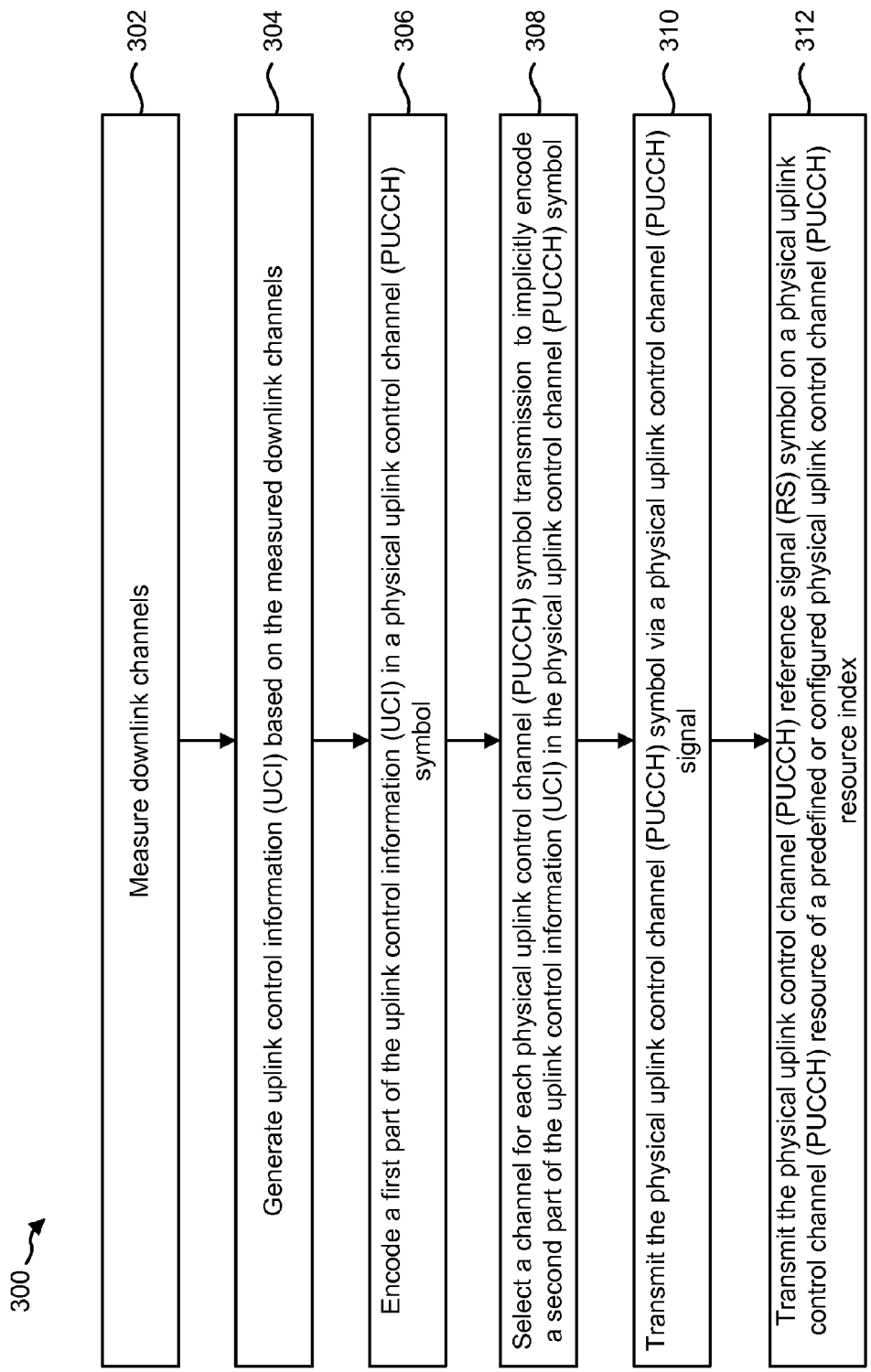
FIG. 3 is a flow diagram of a method for reporting extended uplink control information (UCI)

FIG. 3 is a flow diagram of a method 300 for reporting extended uplink control information (UCI) 228. The method 300 of FIG. 3 may be performed by a wireless communication device 104. The wireless communication device 104 may measure 302 downlink 108 channels. The downlink 108 channels measured may include one or more downlink 108 component carriers (CC).

The wireless communication device 104 may generate 304 uplink control information (UCI) 228 based on the measured downlink 108 channels. The generated uplink control information (UCI) 228 may be referred to as an uplink control information (UCI) payload 118. The wireless communication device 104 may then encode 306 a first part of the uplink control information (UCI) 228 in a physical uplink control channel (PUCCH) symbol 224. The first part of the uplink control information (UCI) 230 may include ACK/NACK 236 bits, channel quality indicator (CQI) 230 bits, precoding matrix index (PMI) 232 bits, rank indication (RI) 234 bits or some combination. For example, the first part of the uplink control information (UCI) 228 may include a joint coding of channel quality indicator (CQI) 230 bits and ACK/NACK 236 bits. The first part of the uplink control information (UCI) 228 may also include a mixed coding method with ACK/NACK performance enhancement.

The wireless communication device 104 may select 308 a channel 229 for each physical uplink control channel (PUCCH) symbol 224 transmission to implicitly encode a second part (i.e., the implicit bits 227) of the uplink control information (UCI) 228 in the physical uplink control channel (PUCCH) symbol 224. The channel 229 of the physical uplink control channel (PUCCH) symbol 224 may refer to the physical uplink control channel (PUCCH) resource index 116 selected by the wireless communication device 104. The wireless communication device 104 may select 308 the channel 229 of the physical uplink control channel (PUCCH) symbol 224 from the assigned physical uplink control channel (PUCCH) resource indexes 116. Physical uplink control channel (PUCCH) resource indexes 116 are discussed in additional detail below.

When channel 229 selection is supported, physical uplink control channel (PUCCH) resource indexes 116 should be configured by higher layers. The use of implicit bits 227 may provide many opportunities to control information reporting with extended payload sizes and allows flexible allocation between uplink control information (UCI) 228 and ACK/NACK 236 bits. The second part of the uplink control information (UCI) 228 may also include ACK/NACK 236 bits, channel quality indicator (CQI) 230 bits, precoding matrix index (PMI) 232 bits, rank indication (RI) 234 bits or some combination. Joint coding and multiplexing may be employed for extended payload sizes. The uplink control information (UCI) 228 may be coded with a lower code rate and then split between the physical uplink control channel (PUCCH) symbol 224 and the implicit channel 229 from channel selection.

The wireless communication device 104 may then transmit 310 the physical uplink control channel (PUCCH) symbol 224 via a physical uplink control channel (PUCCH) signal 238. In one configuration, the wireless communication device 104 may transmit 310 the physical uplink control channel (PUCCH) symbol 224 via only one physical uplink control channel (PUCCH) signal 238. The wireless communication device 104 may also transmit 312 the physical uplink control channel (PUCCH) reference signal (RS) symbol 242 on a physical uplink control channel (PUCCH) resource of a predefined or configured physical uplink control channel (PUCCH) resource index 244. The reference signal (RS) symbol 242 may be transmitted via a reference signal (RS) 240.

Transmit diversity (TxD) effects may be achieved with a single antenna 110 transmission. For a Release-8 payload with format 1/1a/1b and format 2/2a/2b, the implicit channel 229 from channel selection may be used to transmit a second copy of the uplink control information (UCI) 228. In one configuration, transmit diversity (TxD) effects may be achieved with ACK/NACK 236 differentiation for Release-8 format 2/2a/2b. The implicit channel 229 obtained from channel selection may be used to transmit an ACK/NACK 236 differentiated copy of the uplink control information (UCI) 228. Transmit diversity (TxD) effects may also be achieved with multiple antenna 110 transmissions. The same method may be applied on each antenna 110 so that extra transmit diversity (TxD) gain can be obtained.

Figure 4:
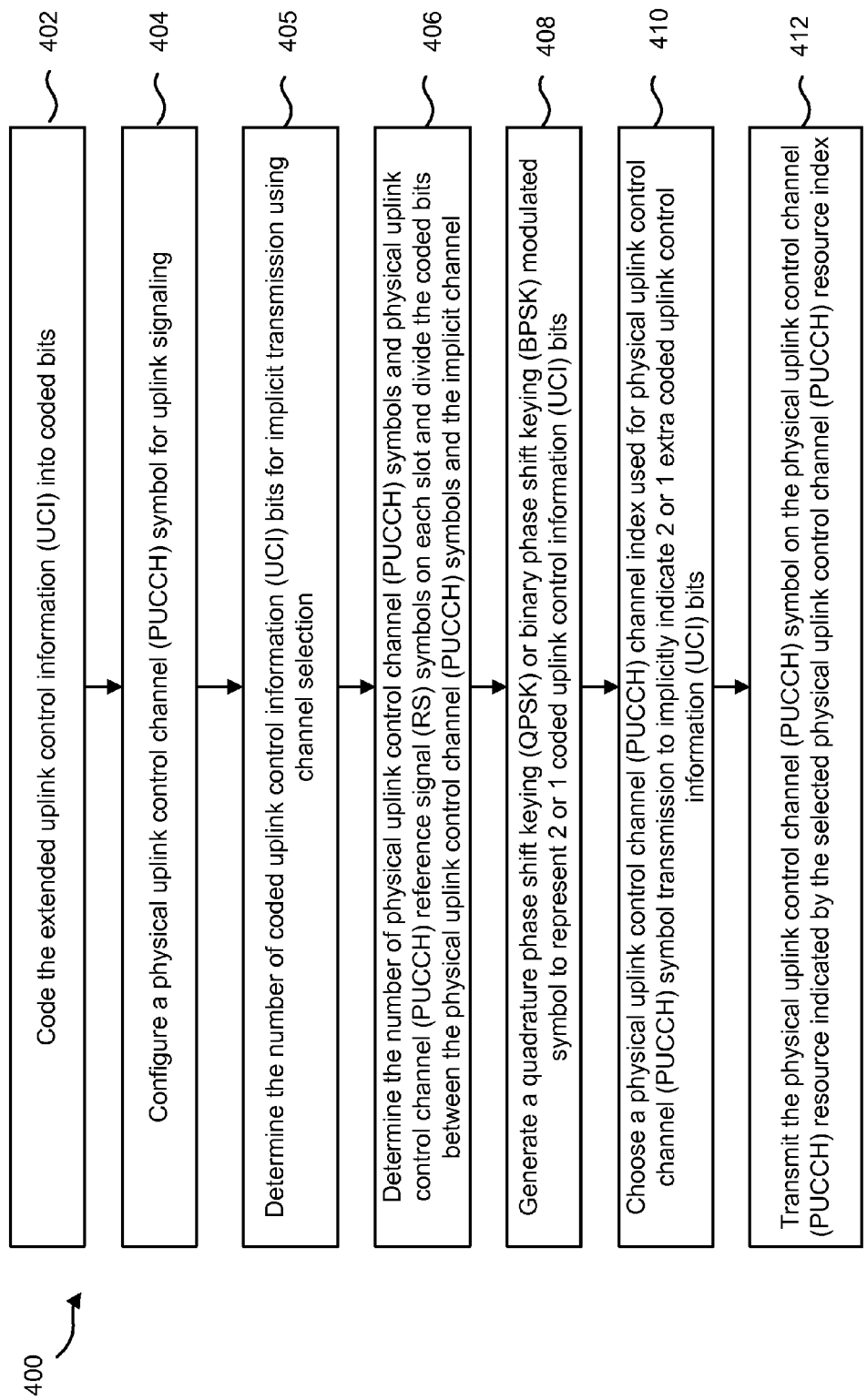
FIG. 4 is a flow diagram of a method for reporting extended uplink control information (UCI)

FIG. 4 is a flow diagram of a method 400 for reporting extended uplink control information (UCI) 228. The method 400 may be performed by a wireless communication device 104. In a Release-8 time division duplexing (TDD) system, ACK/NACK 236 multiplexing with channel selection is supported on the physical uplink control channel (PUCCH). ACK/NACK 236 multiplexing may be used to include additional information in a physical uplink control channel (PUCCH) symbol 224. A maximum of M=4 ACK/NACK/DTX bits can be transmitted using ACK/NACK 236 multiplexing with channel selection.

Four physical uplink control channel (PUCCH) resources $n_{PUCCH,0}^{(1)}$-$n_{PUCCH,3}^{(1)}$ may be used for signaling. The wireless communication device 104 may determine a first bit b(0) and a second bit b(1) of uplink control information (UCI) 228 for implicit transmission using channel selection. The first bit b(0) and the second bit b(1) may represent the second part of the uplink control information (UCI) 228 (i.e., the implicit bits 227). The wireless communication device 104 may then generate the first bit b(0) and the second bit b(1) using an ACK/NACK 236 multiplexing table. The values of the first bit b(0), the second bit b(1) and the ACK/NACK 236 resource $n_{PUCCH}^{(1)}$ may be generated by channel selection according to Table 1 below. Table 1 is Table 10.1-4 in 3GPP TS 36.213.

TABLE 1

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |

TABLE 1-continued

| HARQ-ACK(0), HARQ-ACK(1), HARQ-ACK(2), HARQ-ACK(3) | $n_{PUCCH}^{(1)}$ | b(0), b(1) |
|---|---|---|
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

The wireless communication device 104 may transmit the first bit b(0) and the second bit b(1) on an ACK/NACK 236 symbol using physical uplink control channel (PUCCH) format 1b. An ACK/NACK 236 symbol may be multiplexed to a physical uplink control channel (PUCCH) symbol. With format 1b, there is only one ACK/NACK 236 quadrature phase shift keying (QPSK) symbol. On format 1b physical uplink control channel (PUCCH) transmissions with normal cyclic prefix (CP), the ACK/NACK 236 symbol may be extended to 4 physical uplink control channel (PUCCH) symbols 224. Three physical uplink control channel (PUCCH) reference symbols are included in each slot. Therefore, each slot has seven symbols, four of them are physical uplink control channel (PUCCH) symbols with ACK/NACK 236 information and three of them are reference symbols.

The current Release-8 uses the same physical uplink control channel (PUCCH) resource for an entire subframe once it is chosen. Thus, only two extra bits may be transferred with channel selection. By extending the channel selection mechanism to symbol level, two extra bits (i.e., implicit bits 227) can be transmitted for each physical uplink control channel (PUCCH) symbol 224. The current channel selection mechanism in Release-8 becomes a special case, and can be viewed as a 2-bit repetition on all symbols. This allows for compatibility with legacy devices.

By using a channel selection mechanism at the symbol level, an implicit channel is formed. The total number of coded bits transferred on the physical uplink control channel (PUCCH) can be doubled when compared with a Release-8 physical uplink control channel (PUCCH). Similarly, if one extra bit is carried on the implicit channel, the wireless communication device 104 needs only two assigned physical uplink control channel (PUCCH) resource indexes 116 for the channel selection.

As discussed above, the wireless communication device 104 may generate 304 uplink control information (UCI) 228 based on the measured downlink channels. The wireless communication device 104 may code 402 the extended uplink control information (UCI) into coded bits with one or more coders. It may then configure 404 a physical uplink control channel (PUCCH) symbol 224 for uplink 106 signaling. This may include determining 405 the number of coded uplink control information (UCI) 228 bits for implicit transmission using channel selection. This may also include determining 406 the number of physical uplink control channel (PUCCH) symbols 224 and physical uplink control channel (PUCCH)

reference signal (RS) symbols 242 on each slot and dividing the coded bits between the physical uplink control channel (PUCCH) symbols 224 and the implicit channel.

The wireless communication device may generate 408 a quadrature phase shift keying (QPSK) or binary phase shift keying (BPSK) modulated symbol to represent 2 or 1 coded uplink control information (UCI) 228 bits. The wireless communication device may choose 410 a physical uplink control channel (PUCCH) channel index used for physical uplink control channel (PUCCH) symbol 224 transmission to implicitly indicate 2 or 1 extra coded uplink control information (UCI) bits 227 on the same physical uplink control channel (PUCCH) symbol 224. The wireless communication device may transmit 412 the physical uplink control channel (PUCCH) symbol 224 on the physical uplink control channel (PUCCH) resource indicated by the selected physical uplink control channel (PUCCH) resource index.

Similar to a release-8 time division multiplexing (TDD) system, four physical uplink control channel (PUCCH) resources $n_{PUCCH,0}$-$n_{PUCCH,3}$ may be used for signaling. Thus, two bits may be mapped implicitly; a sample mapping is defined in Table 2. If only one bit may be required implicitly, only two of the four physical uplink control channel (PUCCH) resources $n_{PUCCH,0}$ and $n_{PUCCH,1}$ may be necessary with an example mapping given in Table 3.

TABLE 2

| Implicit Bits | PUCCH channel to be used for PUCCH symbol transmission |
| --- | --- |
| 0 0 | $n_{PUCCH,0}$ |
| 0 1 | $n_{PUCCH,1}$ |
| 1 0 | $n_{PUCCH,2}$ |
| 1 1 | $n_{PUCCH,3}$ |

TABLE 3

| Implicit bits | PUCCH channel to be used for PUCCH symbol transmission |
| --- | --- |
| 0 | $n_{PUCCH,0}$ |
| 1 | $n_{PUCCH,1}$ |

Figure 5:
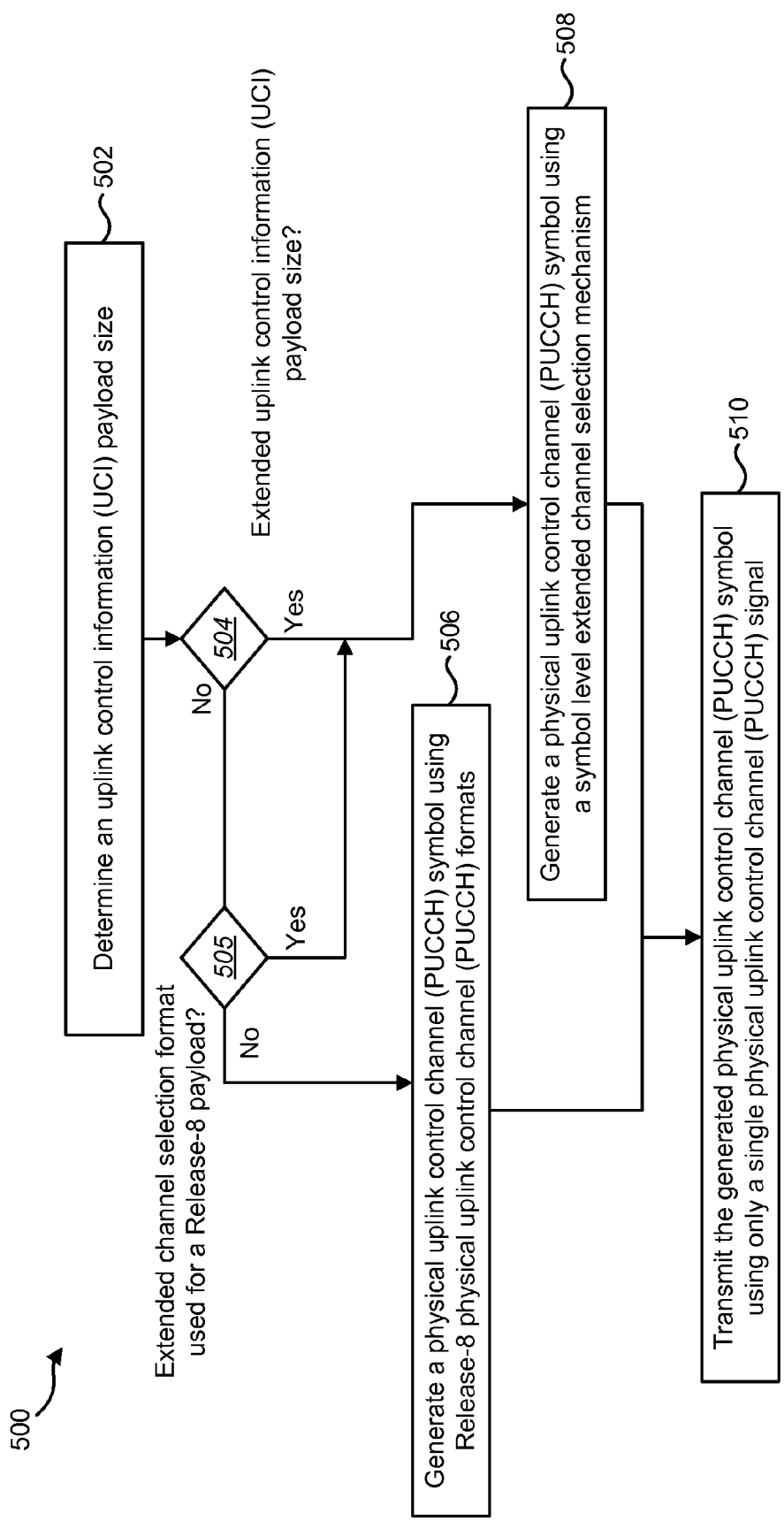
FIG. 5 is a method for generating a physical uplink control channel (PUCCH) symbol depending on the size of an uplink control information (UCI) payload and if the extended channel selection format is used.

FIG. 5 is a method 500 for generating a physical uplink control channel (PUCCH) symbol 224 depending on the size of an uplink control information (UCI) payload 118 and if the extended channel selection format is used. The method 500 may be performed by a wireless communication device 104. The wireless communication device 104 may determine 502 an uplink control information (UCI) payload 118 size. The wireless communication device 104 may then determine 504 if the uplink control information (UCI) payload 118 is an extended uplink control information (UCI) payload 118 size. An extended uplink control information (UCI) payload 118 size refers to uplink control information (UCI) payloads 118 that are larger than the size of a Release-8 uplink control information (UCI) payload 118. To maintain backward compatibility, the Release-8 formats should be used for Release-8 payload sizes and symbol level extended channel selection should be used for extended payload sizes and/or enhancement over existing systems.

If the uplink control information (UCI) payload 118 has an extended uplink control information (UCI) payload 118 size, the wireless communication device 104 may generate 508 a physical uplink control channel (PUCCH) symbol 224 using a symbol level extended channel selection mechanism. A symbol level extended channel selection mechanism refers to the use of a channel selection concept to increase the number of bits in a physical uplink control channel (PUCCH) symbol 224. If the uplink control information (UCI) payload 118 does not have an extended uplink control information (UCI) payload 118 size, the wireless communication device 104 may determine 505 whether an extended channel selection format is used for a Release-8 payload. If an extended channel selection format is used for a Release-8 payload, the wireless communication device 104 may generate 508 a physical uplink control channel (PUCCH) symbol 224 using a symbol level extended channel selection mechanism. If an extended channel selection format is not used for a Release-8 payload, the wireless communication device 104 may generate 506 a physical uplink control channel (PUCCH) symbol 224 using Release-8 physical uplink control channel (PUCCH) formats. Once the wireless communication device 104 has generated a physical uplink control channel (PUCCH) symbol, the wireless communication device 104 may transmit 510 the generated physical uplink control channel (PUCCH) symbol 224 using only a single physical uplink control channel (PUCCH) signal 238.

Even for a Release-8 payload size, the wireless communication device 104 may determine whether or not to use an extended channel selection format (i.e., whether or not an extended channel selection format is used for a Release-8 payload). If so, the implicit channel can be used to enhance performance. For example, to achieve a transmit diversity (TxD) effect without using multiple antenna transmissions and provide extra differentiation on the more important ACK/NACK 236 bits.

Figure 6:
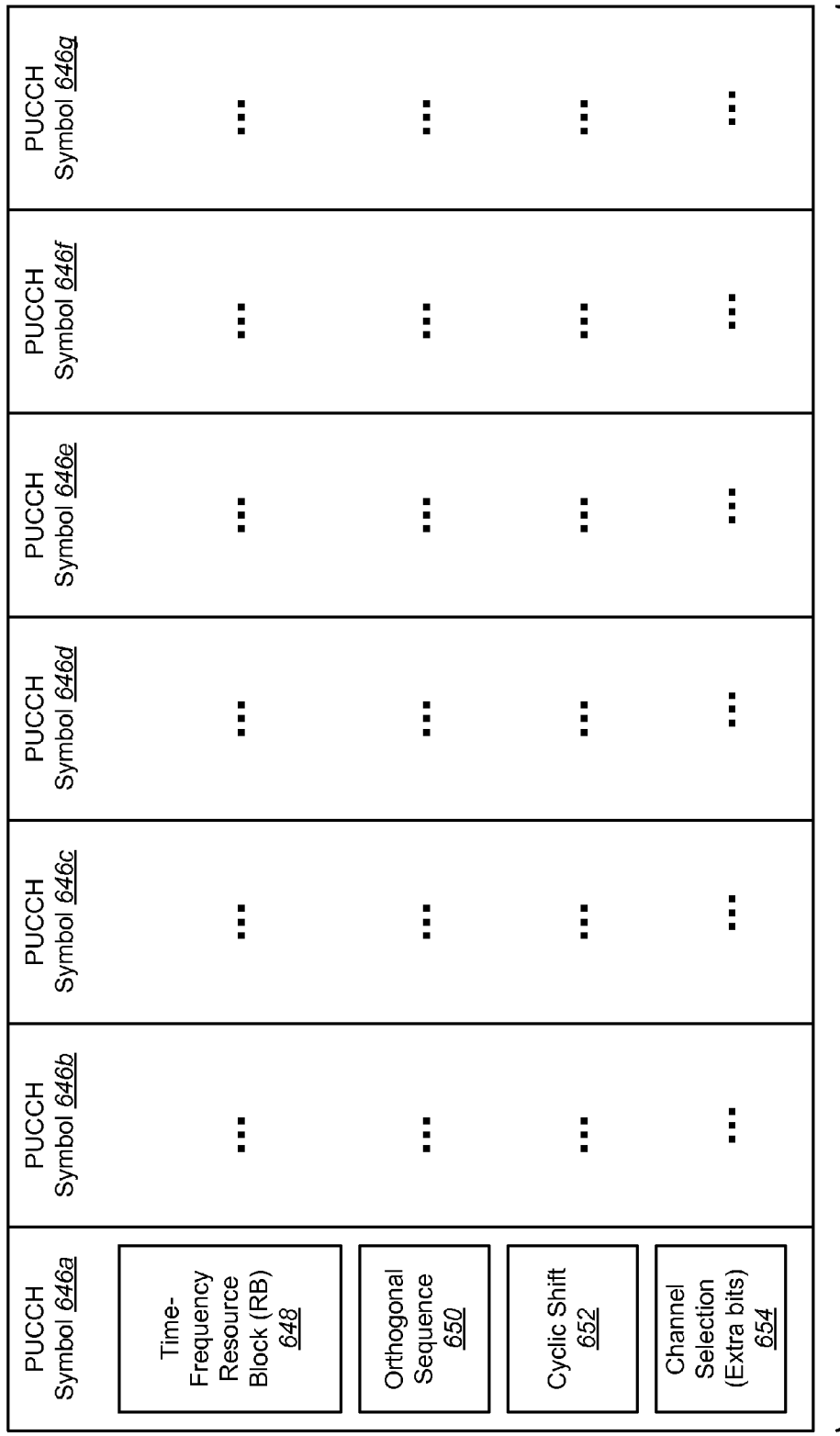
FIG. 6 is a block diagram illustrating physical uplink control channel (PUCCH) symbols as part of a slot.

FIG. 6 is a block diagram illustrating physical uplink control channel (PUCCH) symbols 646 as part of a slot 656. A physical uplink control channel (PUCCH) resource is allocated within a subframe, which consists of two slots 656. With normal cyclic prefix (CP), each slot 656 has seven physical uplink control channel (PUCCH) symbols 646a-g. In Release-8 format 2/2a/2b, two of the physical uplink control channel (PUCCH) symbols 646 may be used as physical uplink control channel (PUCCH) reference symbols and five may be used for a physical uplink control channel (PUCCH) message. Thus, with normal CP, the physical uplink control channel (PUCCH) has ten message carrying symbols 646 and four reference symbols. With format 2a/2b, two reference symbols may be used for the ACK/NACK 236 and the other ten symbols may be used for the other uplink control information (UCI) 228.

In Release-8 with extended CP, each slot 656 has six symbols 646. One of the symbols 646 may be used as a physical uplink control channel (PUCCH) reference symbol and the five other symbols 646 may be used for a physical uplink control channel (PUCCH) message. Thus, the physical uplink control channel (PUCCH) may have ten message carrying symbols 646 and two reference symbols 646. Because there is only one reference symbol 646 in each slot 656, ACK/NACK 236 coding is not possible with extended CP. Therefore, with format 2, the ACK/NACK 236 may be joint coded with the other uplink control information (UCI) 228 (such as the channel quality indicator (COI) 230, the precoding matrix index (PMI) 232 and the rank indication (RI) 234)) and transmitted in the ten message carrying symbols 646.

Each physical uplink control channel (PUCCH) symbol 646 may include a time-frequency resource block (RB) 648 for transmission. As discussed above, symbols 646 transmitted in one slot 656 should be on the same time-frequency resource block (RB) 648. Each symbol 646 within a slot 656 may have a different applied orthogonal sequence 650 and a different cyclic shift 652. A scheduler may assign the best orthogonal sequence 650 and cyclic shift 652 combinations to minimize blind decoding miss-detection probability for a receiving base station 102.

Each symbol 646 may include a channel selection 654. As discussed above, the channel selection 654 may implicitly carry extra bits 227. In one configuration, the channel selection 654 may carry two extra bits 227 for each symbol 646. Each symbol 646 may include a different channel selection 654. Furthermore, the physical uplink control channel reference signal (RS) symbol 242 may be transmitted on a physical uplink control channel (PUCCH) resource of a predefined or configured physical uplink control channel (PUCCH) resource index 244.

Figure 7:
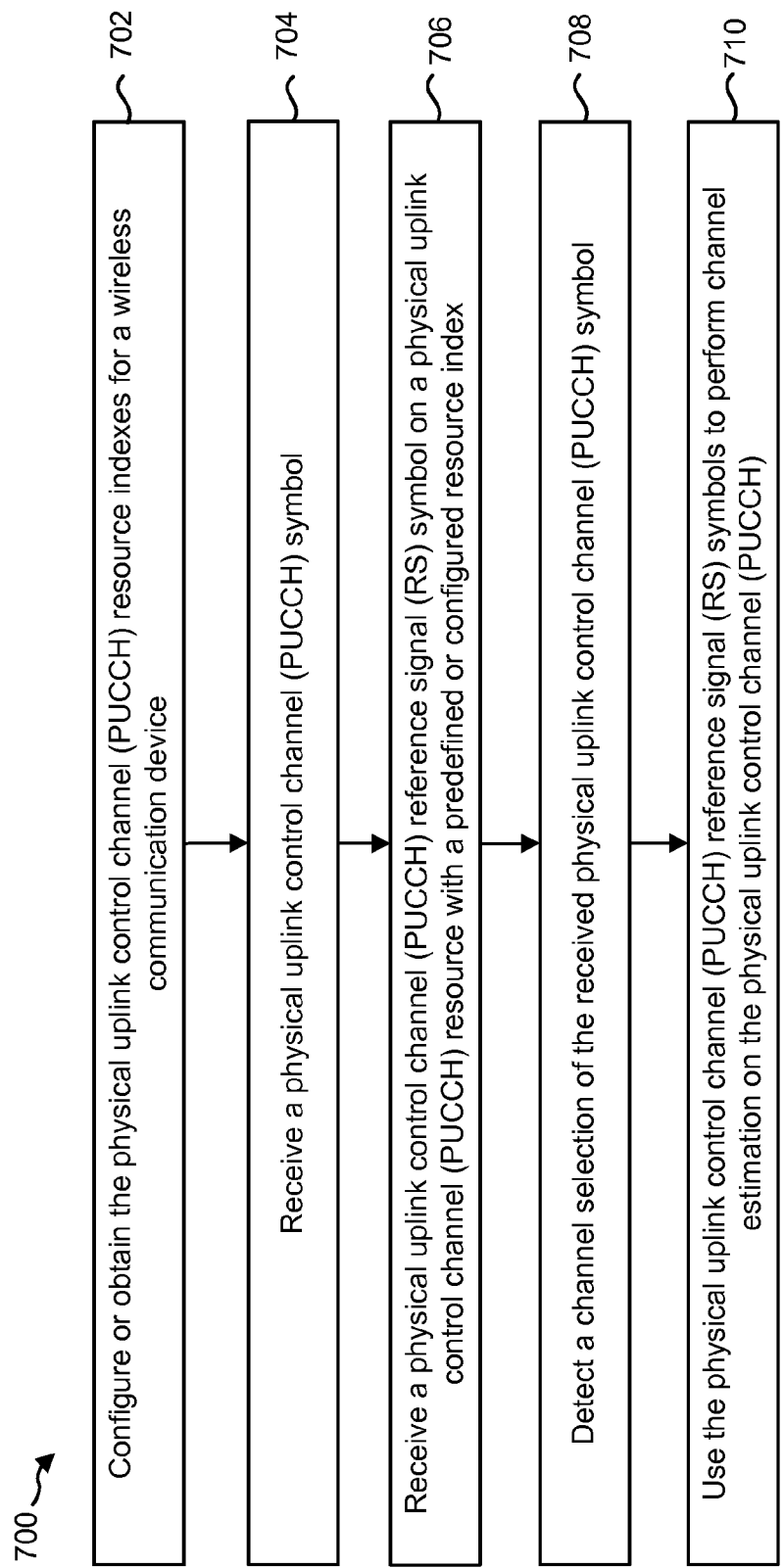
FIG. 7 is a flow diagram of a method for receiving extended uplink control information (UCI)

FIG. 7 is a flow diagram of a method 700 for receiving extended uplink control information (UCI) 228. The method 700 may be performed by a base station 102. The base station 102 may configure or obtain 702 the physical uplink control channel (PUCCH) resource indexes for a wireless communication device 104. The base station 102 may receive 704 a physical uplink control channel (PUCCH) symbol 224. The base station may also receive 706 physical uplink control channel (PUCCH) reference signal (RS) symbols 242 on a physical uplink control channel (PUCCH) resource with a predefined or configured resource index 244. Both the physical uplink control channel (PUCCH) symbol 224 and the physical uplink control channel (PUCCH) reference signal (RS) symbols 242 may be received from a wireless communication device 104.

The base station 102 may detect 706 a channel 229 selection of the received physical uplink control channel (PUCCH) symbol 224. The channel 229 selection may implicitly indicate additional bits 227 included within the received physical uplink control channel (PUCCH) symbol 224. Examples of the channel 229 selection and the extra bits 227 associated with the channel 229 selection were given above in relation to Table 2 and Table 3. The base station 102 may then use 708 the physical uplink control channel (PUCCH) reference signal (RS) symbols 242 to perform channel estimation on the physical uplink control channel (PUCCH). If the physical uplink control channel (PUCCH) reference signal (RS) symbols 242 are on a pre-defined or configured physical uplink control channel (PUCCH) resource, no mistake of channel selection error will be introduced on the channel estimation. Thus, the channel estimation will be more reliable.

Figure 8:
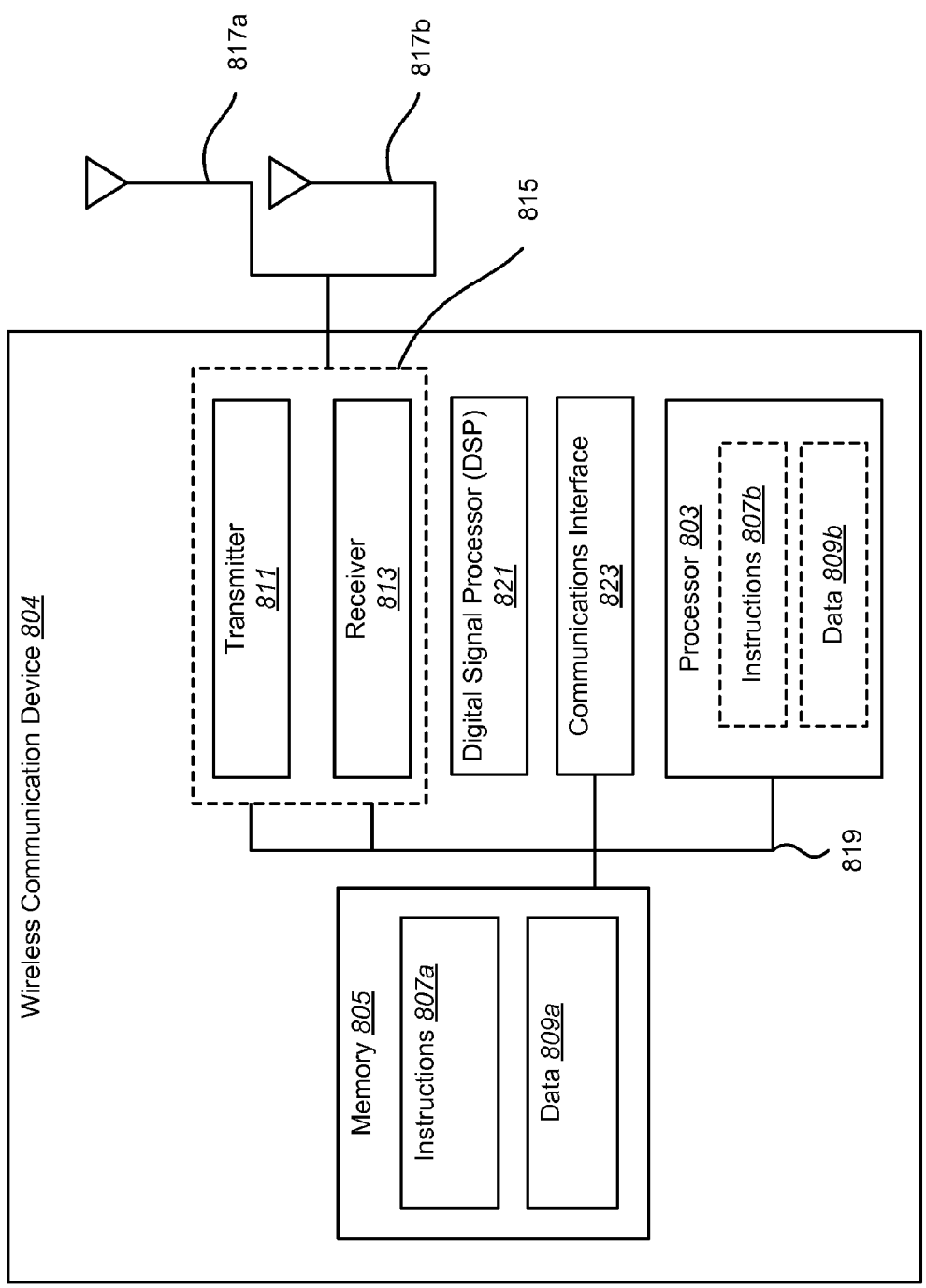
FIG. 8 illustrates various components that may be utilized in a wireless communication device.

FIG. 8 illustrates various components that may be utilized in a wireless communication device 804. The wireless communication device 804 may be a laptop, a wireless modem, a handheld device, etc. The wireless communication device 802 includes a processor 803 that controls operation of the wireless communication device 802. The processor 803 may also be referred to as a CPU. Memory 805, which may include both read-only memory (ROM), random access memory (RAM) or any type of device that may store information, provides instructions 807a and data 809a to the processor 803. A portion of the memory 805 may also include non-volatile random access memory (NVRAM). Instructions 807b and data 809b may also reside in the processor 803. Instructions 807b loaded into the processor 803 may also include instructions 807a from memory 805 that were loaded for execution by the processor 803. The instructions 807b may be executed by the processor 803 to implement the methods disclosed herein.

The wireless communication device 804 may also include a housing that includes a transmitter 811 and a receiver 813 to allow transmission and reception of data. The transmitter 811 and receiver 813 may be combined into a transceiver 815. A first antenna 817a and a second antenna 817b are attached to the housing and electrically coupled to the transceiver 815. Additional antennas may also be used.

The various components of the wireless communication device 804 are coupled together by a bus system 819 which may include a power bus, a control signal bus, and a status signal bus, in addition to a data bus. However, for the sake of clarity, the various buses are illustrated in FIG. 8 as the bus system 819. The wireless communication device 804 may also include a digital signal processor (DSP) 821 for use in processing signals. The wireless communication device 802 may also include a communications interface 823 that provides user access to the functions of the wireless communication device 804. The wireless communication device 804 illustrated in FIG. 804 is a functional block diagram rather than a listing of specific components.

Figure 9:
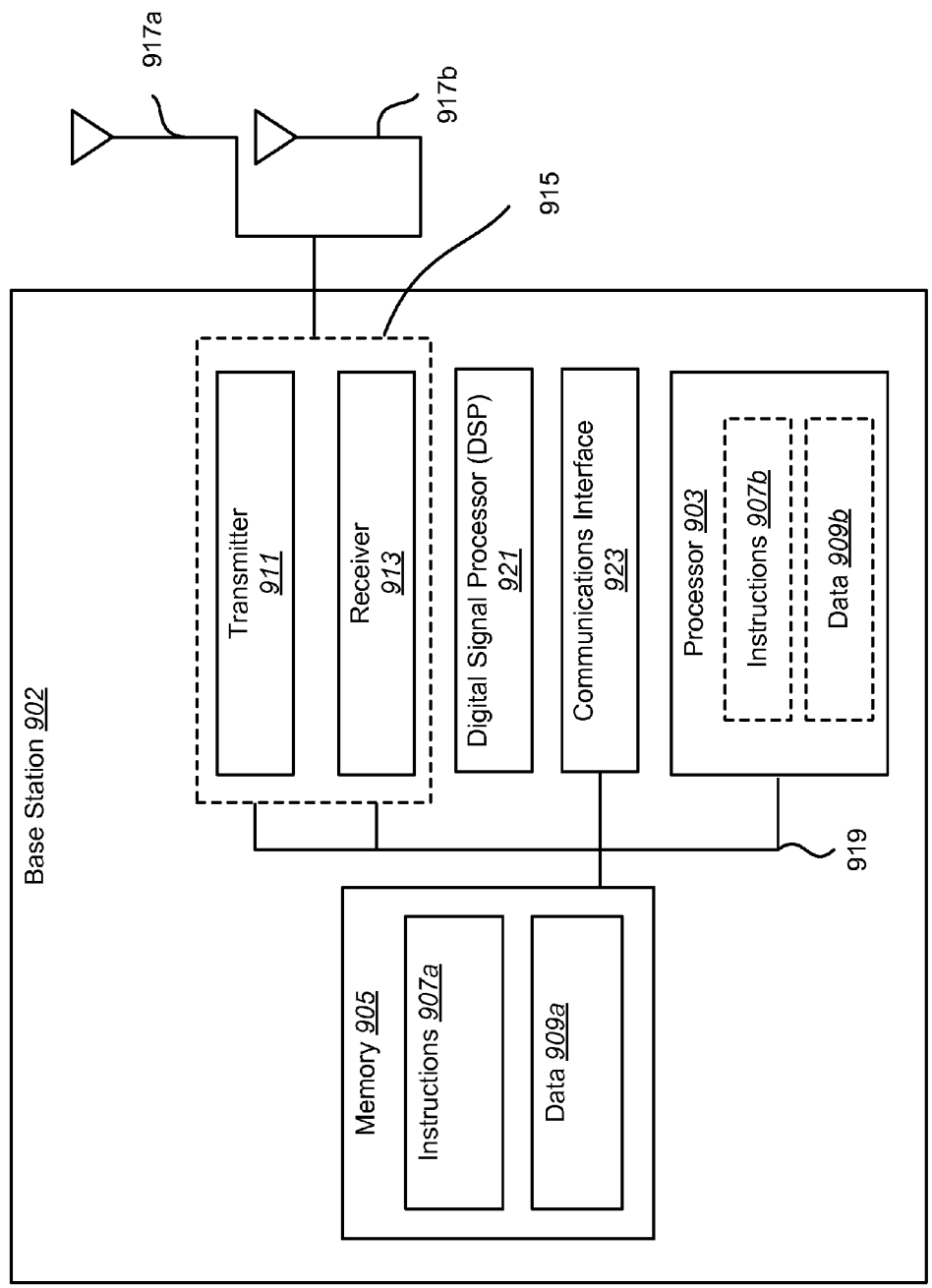
FIG. 9 illustrates various components that may be utilized in a base station.

FIG. 9 illustrates various components that may be utilized in a base station 902. The base station 902 may include components that are similar to the components discussed above in relation to the wireless communication device 804, including a processor 903, memory 905 that provides instructions 907a and data 909a to the processor 903, instructions 907b and data 909b that may reside in the processor 903, a housing that contains a transmitter 911 and a receiver 913 (which may be combined into a transceiver 915), a first antenna 917a and a second antenna 917b electrically coupled to the transceiver 915, a bus system 919, a digital signal processor (DSP) 921 for use in processing signals, a communications interface 923, and so forth.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reporting uplink control information (UCI), comprising:
    encoding a first part of the UCI in a single physical uplink control channel (PUCCH) symbol;
    selecting a channel for the single PUCCH symbol to implicitly encode a second part of the UCI in the single PUCCH symbol;
    configuring the single PUCCH symbol for uplink signaling;
    determining a number of coded UCI bits for implicit transmission using channel selection, wherein selecting a channel for the single PUCCH symbol comprises generating a first bit or the first bit and a second bit of the coded UCI bits using a table;
    transmitting the first bit or the first bit and the second bit in the single PUCCH symbol; and
    transmitting the single PUCCH symbol via a single PUCCH signal.

2. The method of claim 1, further comprising transmitting a reference signal (RS) using a PUCCH resource with a predefined or configured resource index.

3. The method of claim 2, wherein the predefined or configured resource index indicates the selected channel for the single PUCCH symbol.

4. The method of claim 1, further comprising:
    measuring downlink channels; and
    generating the UCI based on the measured downlink channels.

5. The method of claim 1, wherein the UCI comprises a channel quality indicator (CQI), a precoding matrix index (PMI), rank indication (RI) and acknowledgement/negative acknowledgement (ACK/NACK) information.

6. The method of claim 1, wherein the table is a sample mapping table, wherein the first bit or the first bit and the second bit are transmitted by selecting the corresponding PUCCH resource index, and wherein the single PUCCH symbol is generated from another or the same set of the first bit or the first bit and the second bit with binary phase shift keying (BPSK) or quadrature phase shift keying (QPSK) modulation.

7. The method of claim 1, further comprising:
    determining a UCI payload size;
    determining whether the UCI payload size is an extended UCI payload size; and
    generating the single PUCCH symbol using a symbol level extended channel selection mechanism if the UCI payload size is an extended UCI payload size.

8. A method for reporting uplink control information (UCI), comprising:
    determining a UCI payload size;
    determining whether the UCI payload size is an extended UCI payload size;
    determining whether an extended channel selection format is used for a Release-8 payload if the UCI payload size is not an extended UCI payload size; and
    generating a single physical uplink control channel (PUCCH) the PUCCH symbol using Release-8 PUCCH formats if the UCI payload size is not an extended UCI payload size and the extended channel selection is not used for a Release-8 payload;
    encoding a first part of the UCI in the single PUCCH symbol;
    selecting a channel for the single PUCCH symbol to implicitly encode a second part of the UCI in the single PUCCH symbol; and
    transmitting the single PUCCH symbol via a single PUCCH signal.

9. A method for reporting uplink control information (UCI), comprising:
    determining a UCI payload size;
    determining whether the UCI payload size is an extended UCI payload size;
    determining whether an extended channel selection format is used for a Release-8 payload if the UCI payload size is not an extended UCI payload size;
    generating a single physical uplink control channel (PUCCH) symbol using a symbol level extended channel selection mechanism if the extended channel selection is used for a Release-8 payload;
    encoding a first part of the UCI in the single PUCCH symbol;
    selecting a channel for the single PUCCH symbol to implicitly encode a second part of the UCI in the single PUCCH symbol; and transmitting the single PUCCH symbol via a single PUCCH signal.

10. The method of claim 1, wherein the method is performed by a wireless communication device configured to operate in a Long Term Evolution-Advanced (LTE-A) wireless communication system.

11. The method of claim 1, wherein each PUCCH symbol in a slot uses the same time-frequency resource block (RB), different orthogonal sequences, and different cyclic shifts.

12. The method of claim 1, wherein the channel of the single PUCCH symbol is selected from one or more assigned PUCCH resource indexes.

13. The method of claim 1, wherein selecting a channel for the single PUCCH symbol implicitly encodes two bits of the UCI in the single PUCCH symbol.

14. The method of claim 1, wherein selecting a channel for the single PUCCH symbol achieves a transmit diversity (T×D) effect.

15. The method of claim 1, wherein the first part of the UCI comprises acknowledgement/negative acknowledgement (ACK/NACK) bits and the second part of the UCI comprises channel quality indicator (CQI) bits.

16. The method of claim 1, wherein the first part of the UCI and the second part of the UCI comprise joint coding of channel quality indicator (CQI) bits and acknowledgement/negative acknowledgement (ACK/NACK) bits.

17. An apparatus configured for reporting uplink control information (UCI), the apparatus comprising:
a processor;
memory in electronic communication with the processor; and
instructions stored in the memory, the instructions being executable to:
encode a first part of the UCI in a single physical uplink control channel (PUCCH) symbol;
select a channel for the single PUCCH symbol to implicitly encode a second part of the UCI in the single PUCCH symbol;
configure the single PUCCH symbol for uplink signaling;
determine a number of coded UCI bits for implicit transmission using channel selection, wherein selecting a channel for the single PUCCH symbol comprises generating a first bit or the first bit and a second bit of the coded UCI bits using a table;
transmit the first bit or the first bit and the second bit in the single PUCCH symbol; and
transmit the single PUCCH symbol via a single PUCCH signal.

18. The apparatus of claim 17, wherein the instructions are further executable to transmit a reference signal (RS) using a PUCCH resource with a predefined or configured resource index.

19. The apparatus of claim 18, wherein the predefined or configured resource index indicates the selected channel of the single PUCCH symbol.

20. The apparatus of claim 17, wherein the instructions are further executable to:
measure downlink channels; and
generate the UCI based on the measured downlink channels.

21. The apparatus of claim 17, wherein the UCI comprises a channel quality indicator (CQI), a precoding matrix index (PMI), rank indication (RI) and acknowledgement/negative acknowledgement (ACK/NACK) information.

22. The apparatus of claim 17, wherein the table is a sample mapping table, wherein the first bit or the first bit and the second bit are transmitted by selecting the corresponding PUCCH resource index, and wherein the single PUCCH symbol is generated from another or the same set of the first bit or the first bit and the second bit with binary phase shift keying (BPSK) or quadrature phase shift keying (QPSK) modulation.

23. The apparatus of claim 17, wherein the instructions are further executable to:
determine a UCI payload size;
determine whether the UCI payload size is an extended UCI payload size; and
generate the single PUCCH symbol using a symbol level extended channel selection mechanism if the UCI payload size is an extended UCI payload size.

24. An apparatus configured for reporting uplink control information (UCI), the apparatus comprising:
a processor;
memory in electronic communication with the processor; and
instructions stored in the memory, the instructions being executable to:
determine a UCI payload size;
determine whether the UCI payload size is an extended UCI payload size;
determine whether an extended channel selection format is used for a Release-8 payload if the UCI payload size is not an extended UCI payload size;
generate a single physical uplink control channel (PUCCH) symbol using Release-8 PUCCH formats if the UCI payload size is not an extended UCI payload size and the extended channel selection is not used for a Release-8 payload;
encode a first part of the UCI in the single PUCCH symbol;
select a channel for the single PUCCH symbol to implicitly encode a second part of the UCI in the single PUCCH symbol; and
transmit the single PUCCH symbol via a single PUCCH signal.

25. An apparatus configured for reporting uplink control information (UCI), the apparatus comprising:
a processor;
memory in electronic communication with the processor; and
instructions stored in the memory, the instructions being executable to:
determine a UCI payload size;
determine whether the UCI payload size is an extended UCI payload size;
determine whether an extended channel selection format is used for a Release-8 payload if the UCI payload size is not an extended UCI payload size;
generate a single physical uplink control channel (PUCCH) symbol using a symbol level extended channel selection mechanism if the extended channel selection is used for a Release-8 payload;
encode a first part of the UCI in the single PUCCH symbol;
select a channel for the single PUCCH symbol to implicitly encode a second part of the UCI in the single PUCCH symbol; and
transmit the single PUCCH symbol via a single PUCCH signal.

26. The apparatus of claim 17, wherein the apparatus is a wireless communication device configured to operate in a Long Term Evolution-Advanced (LTE-A) wireless communication system.

27. The apparatus of claim 17, wherein each PUCCH symbol in a slot uses the same time-frequency resource block (RB), different orthogonal sequences and different cyclic shifts.

28. The apparatus of claim 17, wherein the channel of the single PUCCH symbol is selected from one or more assigned PUCCH resource indexes.

29. The apparatus of claim 17, wherein selecting a channel for the single PUCCH symbol implicitly encodes two bits of the UCI in the single PUCCH symbol.

30. The apparatus of claim 17, wherein selecting a channel for the single PUCCH symbol achieves a transmit diversity (TxD) effect.

31. The apparatus of claim 17, wherein the first part of the UCI comprises acknowledgement/negative acknowledgement (ACK/NACK) bits and the second part of the UCI comprises channel quality indicator (CQI) bits.

32. The apparatus of claim 17, wherein the first part of the UCI and the second part of the UCI comprise joint coding of channel quality indicator (CQI) bits and acknowledgement/negative acknowledgement (ACK/NACK) bits.

33. A computer-program product for reporting uplink control information (UCI), the computer-program product comprising a computer-readable medium having instructions thereon, the instructions comprising:

code for causing a wireless communication device to encode a first part of the UCI in a single physical uplink control channel (PUCCH) symbol;

code for causing the wireless communication device to select a channel for the single PUCCH symbol to implicitly encode a second part of the UCI in the single PUCCH symbol;

code for causing the wireless communication device to configure the single PUCCH symbol for uplink signaling;

code for causing the wireless communication device to determine a number of coded UCI bits for implicit transmission using channel selection, wherein selecting a channel for the single PUCCH symbol comprises generating a first bit or the first bit and a second bit of the coded UCI bits using a table;

code for causing the wireless communication device to transmit the first bit or the first bit and the second bit in the single PUCCH symbol; and code for causing the wireless communication device to transmit the single PUCCH symbol via a single PUCCH signal.

* * * * *

UNITED STATES PATENT AND TRADEMARK OFFICE
CERTIFICATE OF CORRECTION

PATENT NO.       : 8,750,143 B2                                  Page 1 of 1
APPLICATION NO.  : 12/753561
DATED            : June 10, 2014
INVENTOR(S)      : Yin It is certified that error appears in the above-identified patent and that said Letters Patent is hereby corrected as shown below:

In the Specification
Column 4, line 42 please delete "(Cal)" and replace it with --(CQI)--.
Column 5, line 16 please delete "(COI)" and replace it with --(CQI)--.
Column 5, line 18 please delete "(COI)" and replace it with --(CQI)--.
Column 5, line 27 please delete "(COI)" and replace it with --(CQI)--.
Column 7, line 58 please delete "(COI)" and replace it with --(CQI)--.

Signed and Sealed this
Fourth Day of November, 2014

Michelle K. Lee
*Deputy Director of the United States Patent and Trademark Office*